United States Patent [19]

Stevens et al.

[11] Patent Number: 5,034,274

[45] Date of Patent: Jul. 23, 1991

[54] SALT-DOPED CHAFF FIBER HAVING AN EVANESCENT ELECTROMAGNETIC DETECTION SIGNATURE, AND METHOD OF MAKING THE SAME

[75] Inventors: Ward C. Stevens, New Fairfield; Edward A. Sturm, New Milford; Bruce C. Roman, Danbury, all of Conn.

[73] Assignee: Advanced Technology Materials, Inc., Danbury, Conn.

[21] Appl. No.: 448,252

[22] Filed: Dec. 11, 1989

[51] Int. Cl.$^5$ ........................ B32B 15/00; B32B 15/04; B32B 17/06

[52] U.S. Cl. ........................ 428/336; 342/12; 427/252; 428/381; 428/433; 428/469; 428/472

[58] Field of Search ............... 428/469, 471, 472, 433, 428/381, 336; 427/252, 217, 55; 206/328; 65/3.12; 342/12

[56] References Cited

U.S. PATENT DOCUMENTS

| | | | |
|---|---|---|---|
| 2,862,783 | 12/1958 | Drummond | 427/252 |
| 2,920,981 | 1/1960 | Whitehurst | 428/381 |
| 3,097,941 | 7/1963 | Toulmin, Jr. | 65/3.12 |
| 3,129,487 | 1/1965 | Whitacre et al. | 427/252 |
| 3,221,875 | 7/1966 | Paquette | 206/328 |
| 3,544,997 | 2/1967 | Turner et al. | 342/12 |
| 3,549,412 | 12/1970 | Frye et al. | 427/217 |
| 3,725,927 | 3/1973 | Fiedler | 342/12 |
| 3,765,931 | 10/1973 | Kyri et al. | 428/469 |
| 3,952,307 | 4/1976 | Nagler | 342/12 |
| 4,759,950 | 7/1988 | Stevens | 427/55 |

OTHER PUBLICATIONS

Butters, Bryan C. F., "Electronic Countermeasures/-Chaff", IEEE Proceedings, vol. 129, Part F, No. 3, Jun. 1982, pp. 197-201.

*Primary Examiner*—Thomas J. Herbert, Jr.
*Attorney, Agent, or Firm*—Steven J. Hultquist

[57] ABSTRACT

An article comprising a non-conductive substrate having a sub-micron thickness of an oxidizable metal coating thereon, and an oxidation enhancingly effective amount of a salt, e.g., from about 0.005 to about 25% by weight of salt, based on the weight of oxidizable metal, present on the oxidizable metal coating. Also disclosed is a related method of forming such article, comprising chemical vapor depositing the oxidizable metal coating on the substrate, applying the salt by contacting of the oxidizable metal-coated substrate with a salt solution, and drying of the salt solution on the oxidizable metal film to yield the product salt-doped, oxidizable metal-coated substrate article. When utilized in a form comprising fine-diameter substrate elements such as glass or ceramic filaments, the resulting product may be usefully employed as an "evanescent" chaff. In the presence of atmospheric moisture, such evanescent chaff undergoes oxidization of the oxidizable metal coating so that the radar signature of the chaff transiently decays, with the level of salt doping of the oxidizabale metal film being variable to achieve a desired functional life and decay rate of the chaff radar signature.

35 Claims, 2 Drawing Sheets

SALT-DOPED CHAFF FIBER HAVING AN EVANESCENT ELECTROMAGNETIC DETECTION SIGNATURE, AND METHOD OF MAKING THE SAME

CROSS-REFERENCE TO RELATED APPLICATIONS

This application is co-filed with the following related applications, all assigned to the assignee hereof: U.S. application No. 07/449,709, filed Dec. 11, 1989, of Ward C. Stevens, Edward A. Sturm, and Delwyn F. Cummings, for "GALVANICALLY DISSIPATABLE EVANESCENT CHAFF FIBERS, AND METHOD OF MAKING THE SAME"; U.S. application No. 07/450,585, filed Dec. 11, 1989 of Ward C. Stevens, Edward A. Sturm, and Bruce C. Roman for "SULFURIZED CHAFF FIBER HAVING AN EVANESCENT RADAR REFLECTANCE CHARACTERISTIC, AND METHOD OF MAKING THE SAME"; and U.S. application No. 07/449,695 filed Dec. 11, 1989 of Ward C. Stevens, Edward A. Sturm, and Bruce C. Roman, for "CHAFF FIBER COMPRISING INSULATIVE COATING THEREON, AND HAVING AN EVANESCENT RADAR REFLECTANCE CHARACTERISTIC, AND METHOD OF MAKING THE SAME."

BACKGROUND OF THE INVENTION

1. Field of the Invention

This invention relates to chaff with a transient radar reflectance characteristic, having utility as an electronic warfare countermeasure useful as an electromagnetic detection decoy or for anti-detection masking of an offensive attack.

2. Description of the Related Art

In modern warfare, a wide variety of weapons systems are employed which operate across the electromagnetic spectrum, including radio waves, microwaves, infrared signals, ultraviolet signals, x-rays, and gamma rays.

To counter such weapons systems, smoke and other obscurants have been deployed. In the past, smoke has been variously employed as a means of protection of ground-based military vehicles and personnel during conflict, to blind enemy forces, to camouflage friendly forces, and to serve as decoys to divert hostile forces away from the positions of friendly forces. With the evolution of radar guided missiles and increasing use of radar systems for battlefield surveillance and target acquisition, the obscurant medium must provide signal response in the millimeter wavelengths of the electromagnetic spectrum.

The use of "chaff", viz., strips, fibers, particles, and other discontinuous-form, metal-containing media to provide a signal response to radar, began during World War II. The first use of chaff involved metal strips about 300 millimeters long and 15 millimeters wide, which were deployed in units of about 1,000 strips. These chaff units were manually dispersed into the air from flying aircraft, to form chaff "clouds" which functioned as decoys against radars operating in the frequency range of 490–570 Megahertz.

Chaff in the form of aluminum foil strips has been widely used since World War II. More recent developments in chaff technology include the use of aluminum-coated glass filament and silver-coated nylon filament.

In use, chaff elements are formed with dimensional characteristics creating dipoles of roughly one-half the wavelength of the hostile electromagnetic system. The chaff is dispersed into a hostile radar target zone, so that the hostile radar "locks onto" the signature of the chaff dispersion. The chaff is suitably dispersed into the air from airborne aircraft, rockets or warheads, or from ground-based deployment systems.

The chaff materials which have been developed to date function effectively when deployed at moderate to high altitudes, but are generally unsatisfactory as obscuration media in proximity to the ground due to their high settling rates. Filament-type chaff composed of metal-coated fibers may theoretically be fashioned with properties superior to metal strip chaff materials, but historically the "hang time" (time aloft before final settling of the chaff to the ground) is unfortunately still too short to accommodate low altitude use of such chaff. This high settling rate is a result of large substrate diameters necessary for standard processes, typically on the order of 25 microns, as well as thick metal coatings which increase overall density. A further problem with metallized filaments is that typical metal coatings, such as aluminum, remain present and pose a continuing electrical hazard to electrical and electronic systems after the useful life of the chaff is over.

It would therefore be a substantial advance in the art to provide a chaff material which is characterized by a reduced settling rate and increased hang time, as compared with conventional chaff materials, and which overcomes the persistance of adverse electrical characteristics which is a major disadvantage of conventional chaff materials.

Accordingly, it is an object of the present invention to provide an improved chaff material which overcomes such difficulties.

It is another object of the present invention to provide a chaff material having a metal component with an evanescent electromagnetic detection signature.

It is another object of the present invention to provide a chaff material whose electronic signature may be selectively adjusted so that the chaff material is transiently active for a predetermined time, consistent with its purpose and its locus of use.

Other objects and advantages of the present invention will be more fully apparent from the ensuing disclosure and appended claims.

SUMMARY OF THE INVENTION

In one aspect, the present invention relates to an article comprising a non-conductive substrate having a sub-micron thickness of an oxidizable metal coating thereon, and an oxidation enhancingly effective amount of salt on the oxidizable metal coating.

The salt may for example comprise from about 0.005 to about 25% by weight, based on the weight of oxidizable metal, of a metal salt or organic salt on the oxidizable metal coating, the specific amount employed being enhancingly effective for oxidation of the oxidizable metal coating. The oxidizable metal may suitably be any metal species or combination of metal species which is compatible with the substrate and salt material, and appropriate to the end use application of the coated product article. Suitable metals may for example be selected from the group consisting of iron, copper, zinc, tin, nickel, and combinations thereof.

In chaff applications, the oxidizable metal preferably is iron.

The non-conductive substrate may be formed of any of a wide variety of materials, including glasses, polymers, preoxidized carbon, non-conductive carbon, and ceramics, with glasses, particularly oxide glasses and specifically silicate glasses, generally being preferred. For chaff applications, the substrate preferably is in the form of a filament, which may for example be on the order of 0.5 to about 25 microns in diameter, and preferably from about 2 to about 15 microns in diameter. The salt provided on the oxidizable metal coating may be constituted by any of various suitable salts, including metal halide, metal sulfate, metal nitrate, and organic salts. Preferably, the salt is a metal halide salt, whose halide constituent is chlorine.

In chaff applications, wherein the chaff article includes a filamentous or other small-diameter substrate element, the salt-doped oxidizable metal coating of the invention is characterized by a radar signature which in the presence of moisture, e.g., atmospheric humidity, decays as a result of progressive oxidation of the oxidizable metal coating, with the rate of such oxidation being accelerated by the salt constituent present on the oxidizable metal coating.

In a broad method aspect, the present invention relates to a method of forming an evanescently conductive coating on a non-conductive substrate, comprising:

(a) depositing on the substrate a sub-micron thickness of oxidizable metal, to form an oxidizable metal-coated substrate, wherein the oxidizable metal preferably is selected from the group consisting of iron nickel, copper, zinc, tin, and combinations thereof; and (b) providing on the oxidizable metal-coated substrate a salt which is enhancingly effective for the oxidation of the oxidizable metal deposited on the substrate, wherein the salt preferably is present at a concentration of from about 0.005% to about 25%, more preferably from about 0.1% to about 20%, and most preferably from about 0.5% to about 15% by weight of salt, based on the weight of oxidizable metal in the oxidizable metal coating on the substrate and as dictated by the desired corrosion rate.

Other aspects and features of the invention will be more fully apparent from the ensuing disclosure and appended claims.

DETAILED DESCRIPTION OF THE INVENTION, AND PREFERRED EMBODIMENTS THEREOF

Figure 1:
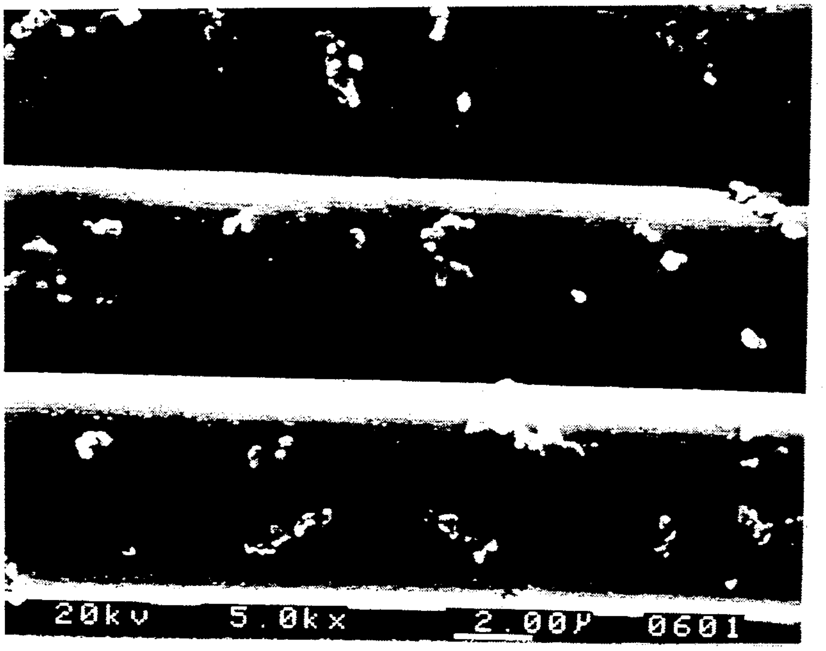
FIG. 1 is an electron photomicrograph, at magnification of 5,000 times, of salt-doped, iron-coated glass filaments according to one embodiment of the present invention, with iron (III) chloride as the deposited salt species.

The present invention relates broadly to an article comprising a non-conductive substrate having a submicron thickness of an oxidizable metal coating thereon, and an oxidation enhancingly effective amount, e.g., from about 0.005% to about 25% by weight, based on the weight of oxidizable metal in the oxidizable metal coating, of a salt (e.g., a metal salt or an organic salt) on the oxidizable metal coating. Preferably, the oxidizable metal is selected from the group consisting of iron, copper, zinc, tin, nickel, and combinations thereof.

Although discussed primarily in the ensuing discussion in terms of chaff article applications, wherein the substrate element preferably is a small-diameter filament, the utility of the present invention is not thus limited, but rather extends to any other applications in which a temporary conductive coating is desired on a substrate.

Examples of other illustrative applications include moisture sensors, corrosivity monitors, moisture barrier devices, and the like.

Accordingly, the substrate may have any composition and may take any form which is suitable to the manufacturing conditions and end use environment of the product article.

For chaff applications, it is preferred that the substrate be in filamentous (i.e., fiber) form, however, other substrate forms, such as microbeads, microballons, hollow fibers, powders, flakes, ribbons, and the like may be employed.

For applications other than chaff, it may be necessary or desirable to provide the substrate element in bulk physical form, or alternatively in a finely divided, filamentous, or particulate form, of the types illustratively described above in connection with chaff articles according to the invention.

Irrespective of its physical form, the substrate element is non-conductive in character, and may be formed of any material which is appropriate to the processing conditions and end use applications of the product article. Illustrative substrate element materials of construction include glass, polymeric, ceramic, preoxidized carbon, and non-conductive carbon materials.

By "pre-oxidized carbon" is meant polyacrylonitrile fibers which have been heat stabilized.

Among the foregoing group of materials, the classes of glasses and ceramics are preferred in most instances, due to their low cost and light weight. Oxide materials such as boria ($B_2O_3$) may be usefully employed in some applications. For chaff usage, boria has the advantage of being water soluble, whereby it can be dissipated by moisture.

Illustrative examples of potentially useful polymeric materials of construction for substrate elements include fibers of polyethylene, polyester, polyacrylonitrile, and polymeric fibers commercially available under the trademarks Kevlar® and Kynol®.

In chaff applications, the density of the substrate element material of construction preferably is less than 2.9 grams per cubic centimeter, and most preferably is on the order of from about 1.3 to about 2.9 grams per cubic centimeter.

The most preferred materials of construction for chaff articles of the present invention are glasses, particularly oxide glasses, and more specifically silicate glasses. Silicate glasses have been advantageously employed in filamentous substrate elements in the practice of the present invention, and sodium borosilicate, calcium silicate, sodium silicate, aluminosilicate, and aluminoborosilicate glasses may also be used to advantage. In general, the glasses useful for substrate elements in chaff applications have a density on the order of from about 2.3 to about 2.7 grams per cubic centimeter.

When filamentous glass substrate elements are employed to form chaff articles in accordance with the present invention, the fiber diameter of the substrate element preferably is on the order of from about 0.5 to about 25 microns, and more preferably from about 2 to about 15 microns. It is believed that if the fiber diameter is decreased substantially below about 0.5 microns, the coated chaff fibers tend to become readily respirable, with a corresponding adverse effect on the health, safety, and welfare of persons exposed to such chaff. If, on the other hand, the diameter of the glass chaff fiber is increased substantially above 25 microns, the fiber tends to exhibit poor hang times, dropping too rapidly for effective utilization. These size constraints are dictated by the properties of the substrate material. Lower density fibers may be successfully employed at larger diameters.

Deposited on the substrate is a sub-micron thickness of an oxidizable conductive metal coating, which may be formed of any suitable metal-containing composition which includes a metal which is oxidizable in character. Preferably, the oxidizable metal coating is formed of a metal selected from the group consisting of iron, nickel, copper, zinc, tin, and combinations (i.e., alloys, mixtures, eutectics, etc.) of such metals with each other or with other (metallic or non-metallic) constituents.

By "sub-micron thickness" is meant that the oxidizable metal coating has an applied thickness of less than 1.0 micron. Consistent with the objective of the invention to provide a conductive coating on the substrate which is rapidly rendered non-conductive by oxidation thereof, the thickness of the oxidizable metal coating does not exceed 1.0 mil. Further, it has been found that at oxidizable metal coating thicknesses above about 1.0 micron, metal coated filaments in chaff applications tend to stick or adhere to one another, particularly when the chaff is provided in the form of multifilament tows, which typically may contain on the order of from about 200 to about 50,000 filaments per tow, and preferably from about 1,000 to about 12,000 filaments per tow. Additionally, it has been found that at oxidizable metal coating thicknesses significantly above 1.0 micron, differential thermal effects and/or deposition stresses tend to adversely affect the adhesion of the metal film to the substrate element, with consequent increase in the tendency of the oxidizable metal film on the coated article to chip or otherwise decouple.

In chaff applications utilizing filamentous substrate elements, the oxidizable metal coating thickness may suitably be on the order of 0.002 micron to about 0.25 micron, with a thickness range of from about 0.025 micron to about 0.10 micron being generally preferred. Disproportionately lower film thicknesses of the oxidizable metal coating result in discontinuities which adversely affect the desired conductivity characteristics of the applied oxidizable metal coating. In chaff applications, the oxidizable metal preferably is iron, although other metal species such as nickel, copper, zinc, and tin may potentially advantageously be employed, as well as combinations of such metals.

To achieve the desired sub-micron thicknesses of the oxidizable metal coating on the substrate, it is preferred in practice to utilize chemical vapor deposition processes to deposit elemental oxidizable metal on the substrate from an organometal precursor material, although any other process techniques or methods which are suitable to deposit the oxidizable metal coating in the desired thickness may be usefully employed.

It will be recognized, however, that the specific substrate element material of construction must be selected to retain the substrate element's desired end-use characteristics during the coating operation, as well as during the subsequent treatment steps. Accordingly, when chemical vapor deposition is employed to deposit an oxidizable metal coating, e.g., of iron, on the substrate, temperatures in the range of 90° C.-800° C. can be involved in respective steps of the coating process. Oxidizable metal application temperatures are dictated by the thermal carrying properties and thermal stability of the substrate. Thus, these properties of the substrate can determine the properties of the deposited film. Accordingly, a substrate material accommodating a range of processing temperatures is preferred, e.g., glass or ceramic.

As an example of the utilization of chemical vapor deposition to deposit the elemental oxidizable metal coating on the substrate material, the substrate element may be a borosilicate glass fiber with a diameter on the order of 3-8 microns. Such fibers may be processed in a multizone chemical vapor deposition (CVD) system including a first stage in which the substrate filament is desized to remove epoxy or starch size coatings, at a temperature which may be on the order of 650° C.-800° C. and under an inert or oxidizing atmosphere. Following desizing, the clean filament may be conducted at a temperature of 450° C.-600° C. into a coating chamber of the CVD system. In the coating chamber, the hot filament is exposed to an organoiron precursor gas mixture, which may comprise iron pentacarbonyl as the iron precursor compound at a concentration of 5-50% by weight in a carrier gas such as hydrogen. This source gas mixture may be at a temperature on the order of 75° C.-150° C. in the coating chamber, whereby elemental iron is deposited on the substrate element from the carbonyl precursor compound. The coating operation may be carried out with repetition of the heating and coating steps in sequence, to achieve a desired film thickness of the applied iron coating.

It will be appreciated that the foregoing description of coating of the non-conductive substrate with iron is intended to be illustrative only, and that in the broad practice of the present invention, other CVD iron precursor compound gas mixtures may be employed, e.g., ferrocene in a hydrogen carrier gas. Alternatively, other non-CVD techniques may be employed for depositing the oxidizable metal on the substrate, such as solution plating.

Subsequent to application to the substrate of an oxidizable metal coating of the desired thickness, the oxidizable metal-coated substrate is provided with a suitable oxidation enhancingly effective amount, e.g., from about 0.005% to about 25% by weight, based on the weight of oxidizable metal in the oxidizable metal coating, of a salt, e.g., a metal salt or organic salt, on the external surface of the oxidizable metal coating.

The salt may comprise any suitable salt species, such as for example metal salts (e.g., halides, nitrates, sulfates, etc.) and organic salts (e.g., citrates, stearates, acetates, etc.), the choice of a specific salt being readily determinable by simple corrosion tests without undue experimentation. It will likewise be appreciated that the type and amount, or "loading," of the salt on the oxidizable metal coating may be widely varied as necessary or desirable to correlatively provide a predetermined service life for the oxidizable metal under corrosion conditions in the specific end use environment in which the product article is to be deployed.

Since it is desired that the oxidizable metal coating be retained in an oxidizable state, the oxidizable metal-coated substrate suitably is processed in the salt application or formation ("doping"), and succeeding steps, under an inert or other non-oxidizing atmosphere.

The salt doping of the oxidizable metal-coated substrate advantageously may be carried out by passage of the oxidizable metal-coated substrate through a reaction zone in which the oxidizable metal coating is exposed to halogen gas, such as chlorine, to form a metal salt on the oxidizable metal surface, or by contacting of the oxidizable metal-coated substrate with a solution of a salt, e.g., metal salt or organic salt, or in any other suitable manner, effecting the application of the salt to the external surface of the iron coating.

Generally, however, solution bath application of the salt is preferred, and for such purpose the bath may contain a low concentration solution of salt in any suitable solvent. Preferably, the solvent is anhydrous in character, to minimize premature oxidation of the oxidizable metal coating. Alkanolic solvents are generally suitable, such as methanol, ethanol, and propanol, and such solvents are, as indicated, preferably anhydrous in character. The salt may be present in the solution at any suitable concentration, however it generally is satisfactory to utilize a maximum of about 25% by weight of the salt, based on the total weight of the salt solution.

In the preferred salt solution formation of a salt coating on the oxidizable metal surface, any suitable salt may be employed in the salt solution bath, although metal halide salts and metal sulfate salts are preferred. Among metal halide salts, the halogen constituent preferably is chlorine, although other halogen species may be utilized to advantage. Examples of suitable metal halide salts include lithium chloride sodium chloride, zinc chloride, and iron (III) chloride. A preferred metal sulfate species is copper sulfate, $CuSO_4$. Typically from about 0.005 to about 25% by weight of salt, based on the weight of oxidizable metal, is applied to the oxidizable metal coating, with from about 0.1 to 20% by weight being preferred, and from about 0.5% to about 15% being most preferred (all percentages of salt being based on the weight of oxidizable metal in the oxidizable metal coating on the substrate element).

Among the aforementioned illustrative metal chlorides, iron (III) chloride is a preferred salt. It is highly hygroscopic in character, binding six molecules of water for each molecule of iron chloride in its most stable form. Iron (III) chloride has the further advantage that it adds Fe (III) to the metal-coated fiber to facilitate the ionization of the oxidizable metal. For example, in the case of iron as the oxidizable metal on the non-metallic substrate, the presence of Fe (III) facilitates the ionization of Fe (O) to Fe (II). Additionally, iron (III) chloride is non-toxic in character. Copper sulfate is also a preferred salt dopant material since the copper cation functions to galvanically facilitate the ionization of iron, enhancing the rate of dissolution of the iron film, when iron, the preferred oxidizable metal, is employed in the metal coating on the non-metallic substrate.

When the salt dopant is applied from a solution bath, or otherwise from a salt solution, the coated substrate after salt solution coating is dried, such as by passage through a drying oven, to remove solvent from the applied salt solution coating, and yield a dried salt coating on the exterior surface of the oxidizable metal film. The temperature and drying time employed in the solvent removal operation may be readily determined by those skilled in the art without undue experimentation, as appropriate to yield a dry salt coating on the oxidizable metal-coated substrate article. When alkanolic solvents are employed, the drying temperature generally may be on the order of 100° C.

After salt coating of the oxidizable metal-coated substrate, and drying to effect solvent removal from the applied salt coating when the salt is applied from a solvent solution, the resulting salt-doped oxidizable metal-coated substrate product article is packaged for subsequent use.

As indicated, during the processing of the substrate subsequent to application of the oxidizable metal coating thereon, the resulting oxidizable metal-coated substrate preferably is processed under an inert or otherwise non-oxidizing atmosphere, to preserve the oxidizable character of the oxidizable metal film. Thus, the salt coating, drying, and packaging steps may be carried out under a non-oxidizing atmosphere such as nitrogen. In the final packaging step, the salt-doped, oxidizable metal-coated substrate may be disposed in a package, chamber, housing, or other end use containment means, for storage pending use thereof, with a non-oxidizing environment being provided in such containment means. Thus, the final product article may be stored in the containment means under nitrogen, hydrogen or other non-oxidizing atmosphere, or in a vacuum, or otherwise in an environment substantially devoid of oxygen or other oxidizing species or constituents which may degrade the oxidizable metal coating or otherwise adversely affect its utility for its intended end use.

Depending on the type and character of the substrate element, it may be desirable to treat the substrate article in order to enhance the adhesion thereto of the oxidizable metal coating. For example, as described above regarding the usage of glass filament as the substrate element, it may be necessary or desirable to desize the glass filament when same is initially provided with a size or other protective coating, such as an epoxy, silane, or amine size coating, by heat treatment of the filament. More generally, it may be desirable to chemically or thermally etch the substrate surface, such as by acid exposure or flame spray treatment. It may also be desirable to employ a primer or adhesion promoter coating or other interlayer on the substrate to facilitate or enhance the adhesion of the oxidizable metal coating to the substrate. Specifically, it may be desirable in some instances, particularly when the substrate element is formed of materials such as glasses, ceramics, or hydroxy-functionalized materials, to form an interlayer on the substrate surface comprising a material such as polysilicate, titania, and/or alumina, using a sol gel application technique, as is disclosed and claimed in U.S. Pat. No. 4,738,896 issued Apr. 19, 1988 to W. C. Stevens for "SOL GEL FORMATION OF POLYSILICATE, TITANIA, AND ALUMINA INTERLAYERS FOR ENHANCED ADHESION OF METAL FILMS ON SUBSTRATES." The disclosure of this patent hereby is incorporated herein by reference.

Referring now to the drawings, FIG. 1 shows an array of salt-doped, iron-coated glass filaments from a tow of such filaments. Each of these coated filaments comprises a glass fiber core having on an exterior surface thereof a sub-micron iron coating. On the exterior surface of the respective iron coatings of these filaments is a salt coating comprising localized salt crystalline formations. Although the localized salt deposits or polycrystalline formations are present as gross deposits of crystalline salt, it is to be recognized that microcrystals of salt also are present on the exterior surface of the iron coating, intermediate such gross crystal formations. This distribution of gross crystallite formations and scattered microcrystals on the intermediate surface areas is produced by the solution bath application method for applying salt as illustratively described hereinabove.

It is to be recognized, however, that other methods of salt coating may be employed in the broad practice of the present invention, which will result in different distributions or morphologies of salt being formed on the surface. In this respect, it is to be appreciated that the salt may be present on the exterior surface of the iron, or other oxidizable metal, coating solely in the form of scattered crystallite formations, or as a more continuous distribution on the surface of microcrystals, or a combination of such salt formations, as shown in FIG. 1, or in still other distributions or morphologies.

The photomicrograph of FIG. 1 shows the salt-doped, iron-coated glass filament at a magnification of 5,000 times. This electron micrograph was taken at a voltage of 20 kv, and the scale of the photograph is shown by the line in the right central portion at the bottom of the photograph, representing a distance of two microns.

The glass filaments employed in the coated fibers shown in FIG. 1 were of lime aluminoborosilicate composition, commercially available as E-glass (Owens-Corning D filament) 54% $SiO_2$; 14.0% $Al_{23}$; 10.0% $B_2O_3$; 4.5% MgO; and 17.5% CaO)) having a measured diameter of 4.8 microns, and were coated with an iron coating of 0.075 micron thickness. The salt coating was formed of iron (III) chloride, and was present on the iron coating in an amount of from about 1 to about 5% by weight of salt, based on the weight of iron present in the iron coating.

Figure 2:
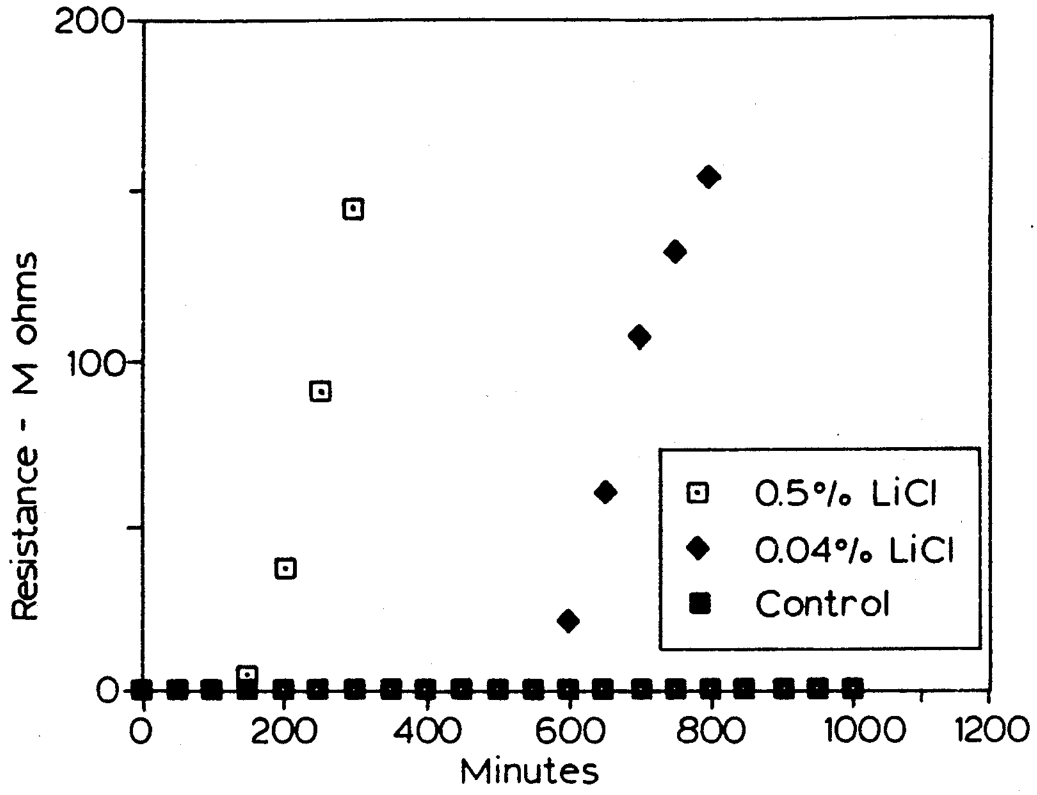
FIG. 2 is a graph of tow resistance, in Megaohms, as a function of exposure time, for a tow of iron-coated glass fibers devoid of any salt coating, and for corresponding tows with 0.04% and 0.5% by weight lithium chloride deposited thereon, respectively, in a 56% relative humidity environment.

FIG. 2 is a graph of resistance, in Megaohms, as a function of exposure time, in minutes, for fiber tows of the type shown in FIG. 1, but which were salt doped, in a first sample, with lithium chloride salt coatings formed by coating the iron film with a 0.04% lithium chloride by weight solvent solution, and, in a second sample, with 0.5% lithium chloride solvent solution. A control tow of fibers was utilized as a basis for comparison, in which the fibers included an iron coating of the same thickness as the two salt-doped fiber tows, but did not include any salt coating.

In order to measure the tow resistance of the respective fiber tows, each tow was mounted on a copper contact circuit board with a known spacing, in either a two-point or fourpoint arrangement. Electrical contact was assured through use of conductive silver paint Fiber tows were analyzed by use of digital multimeter. A known voltage was applied across the fiber circuit. The resulting current was metered and the resistance computed. This measurement was repeated periodically over the fiber lifetime of interest, with voltage applied, during the each interval, for a duration just long enough to allow measurement to be made.

The resistance of each of the respective fiber tows was measured as a function of time of exposure to 56% relative humidity conditions. As shown in the graph, the control tow, comprising fibers devoid of any salt coating thereon, exhibited a constant resistance over an exposure time of 1,000 minutes. The second tow, comprising fibers doped with 0.5% lithium chloride, maintained a constant resistance for approximately 150 minutes and then exhibited a rapid increase in resistance over the next 150 minutes, indicating that the oxidizable iron coatings on the glass filaments in that tow were being rapidly oxidized during the latter time period, with the conductive iron coating being transformed to non-conductive iron oxide. The third fiber tow, comprising fibers doped with 0.04% lithium chloride, maintained a constant resistance for 600 minutes and then exhibited a rapid increase in resistance over the next 200 minutes of exposure, indicating that oxidation of the iron coating was rapidly taking place in the latter time period.

The foregoing results show that the life of the conductive oxidizable metal coating may be controllably adjusted by selective doping levels of salt(s) on the surface of the oxidizable metal coating. Thus, for example, in chaff applications, such selective doping levels may be utilized to correspondingly adjust the service life of the oxidizable metal-coated chaff fibers, consistent with the desired retention of the initial radar signature characteristic thereof for a given length of time, followed by rapid dissipation of the radar signature characteristic of such "evanescent chaff" material.

Figure 3:
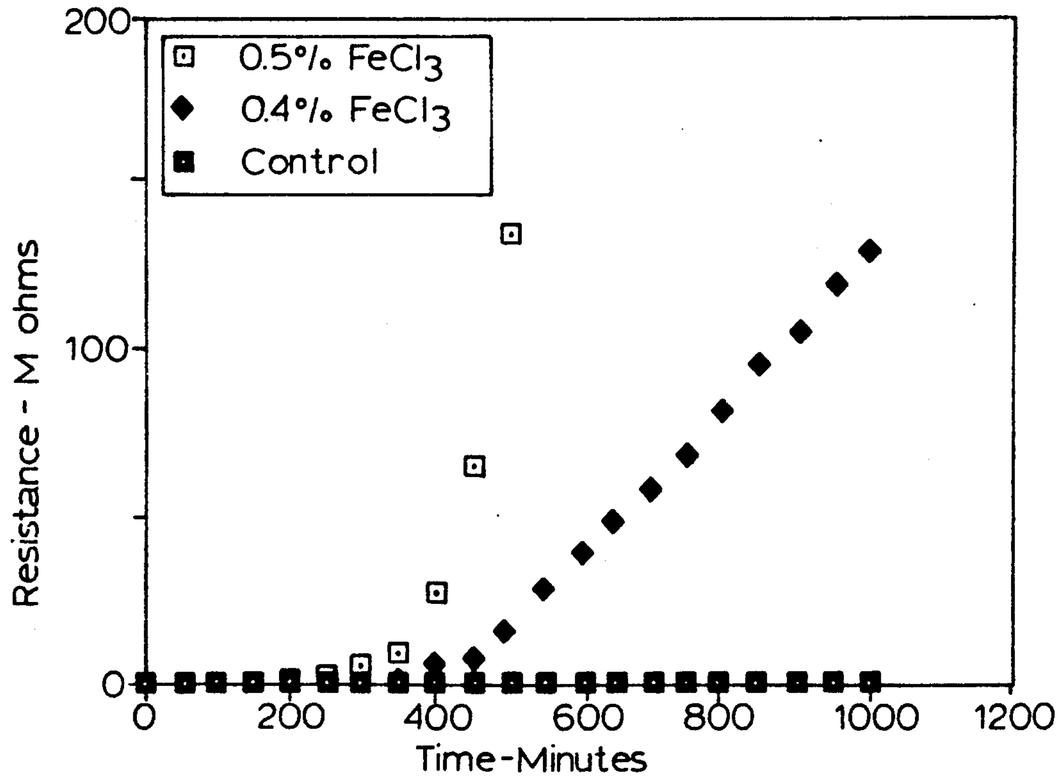
FIG. 3 is a graph of tow resistance, in Megaohms, as a function of exposure time, for a tow of iron-coated glass filaments, devoid of any salt coating, and for corresponding filament tows with 0.04% and 0.5% by weight iron (III) chloride deposited thereon, respectively, in a 58% relative humidity environment.

FIG. 3 is a graph of resistance, in Megaohms, as a function of exposure time, in minutes, for salt-doped, ironcoated glass fibers of the type described hereinabove in connection with FIG. 1, including a first tow having ironcoated fibers doped with salt by solution coating thereof with a 0.04% by weight iron (III) chloride solution, and a second tow with a coating of the same salt material derived from a 0.5% by weight solution thereof. A corresponding control, devoid of any salt coating thereon, was employed for comparison purposes.

As shown by the graph of FIG. 3, the control, having no salt coating on the iron film, exhibited a constant resistance over the full 1,000 minute exposure to 58% relative humidity conditions. The tow containing fibers coated with 0.04% iron (III) chloride solution exhibited a constant resistance for the initial 400 minutes of exposure, followed by a steady increase in the resistance over the succeeding 600 minutes of the 1,000 minute exposure. The third tow, comprising fibers coated with 0.5% iron (III) chloride solution, exhibited a constant resistance value for the initial 200 minutes of exposure, followed by exponentially increasing resistance indicating extremely rapid oxidation of the iron coating. By contrast, the tow comprising fibers coated with the 0.04% iron (III) chloride solution exhibited a substantially linear increase in resistance during oxidation, indicative of uniformly progressing oxidation of the iron coating. These data show that salt doping of the fiber may be employed to selectively adjust the useful life and conductivity decay characteristics of the oxidizable metal film coated on the substrate element.

In some instances in which the salt-doped, oxidizable metal-coated substrate is subjected to contact with other coated articles, or otherwise to abrasion prior to actual deployment, it may be desirable to overcoat the salt coating with a material serving as a fixative for the salt coating, to prevent damage to the salt coating as a result of abrasion or other contacts with would otherwise serve to remove the applied salt material. For example, a porous gel coating or binder material may be applied to the salt-coated oxidizable metal film, for the purpose of adheringly retaining the salt coating in position on the oxidizable metal film. The overcoat may generally be of any suitable material which does not adversely affect the respective salt and oxidizable metal coatings for the intended purpose of the coated product article. For example, it may be desirable to provide an outer coating comprising material selected from the group consisting of polysilicate, titania, and/or alumina, formed on the saltcoated oxidizable metal film from a sol gel dispersion of the polysilicate, titania, and/or alumina material, as more fully disclosed and claimed in our copending U.S. application Ser. No. 07/449,695 filed on Dec. 11, 1989 and entitled "CHAFF FIBER COMPRISING INSULATIVE COATING THEREON, AND HAVING AN EVANESCENT RADAR REFLECATANCE CHARACTERISTIC, AND METHOD OF MAKING THE SAME".

As used herein, the term "oxidizable metal" is intended to be broadly construed to include elemental oxidizable metals per se, and combinations of any of such elemental metals with each other and/or with other metals, and including any and all metals, alloys, eutectics, and intermetallic materials containing one or more of such elemental oxidizable metals, and which are depositable in sub-micron thickness on a substrate and subsequent to such deposition are oxidizable in character.

Although iron is a preferred oxidizable metal in the practice of the present invention, and the invention has been primarily described herein with reference to iron-coated glass filaments, it will be recognized that other metals such as nickel, copper, zinc, and tin may be potentially usefully employed in similar fashion. It will also be recognized that the substrate element may be widely varied, to comprise the use of other substrate element conformations and materials of construction.

In the use of nickel, copper, zinc, and tin as oxidizable metal constituents, preferred salt species may vary from those described above, which are disclosed as being applicable to the invention and preferred in application to iron, but in the context of the broad range of preferred oxidizable metal constituents (iron, nickel, copper, zinc, and/or tin) of the present invention, metal halides, particularly those in which the halide moiety is chlorine, are considered to be a preferred class of salt materials.

The features and advantages of the present invention are more fully shown with reference to the following non-limiting example, wherein all parts and percentages are by weight, unless otherwise expressly stated.

EXAMPLE I

A calcium aluminoborosilicate fiberglass roving material (E-glass, Owens-Corning D filament), comprising glass filaments of approximately 4.8 microns measured diameter and a density of approximately 2.6 grams per cubic centimeter, was desized under nitrogen atmosphere to remove the size coating therefrom, at a temperature of approximately 700° C. Following desizing, the filament roving at a temperature of approximately 500° C. was passed through a chemical vapor deposition chamber maintained at a temperature of 110° C. The chemical vapor deposition chamber contained 10% iron pentacarbonyl in a hydrogen carrier gas. The fiber roving was passed through heating and coating deposition zones in sequence, for a sufficient number of times to deposit a coating of elemental iron at approximately 0.075 micron thickness on the fiber substrate of the roving filaments.

Subsequent to iron coating formation, the roving was passed through a solution bath containing 2% by weight of iron (III) chloride in methanol solution, under nitrogen atmosphere. The roving then was passed through a drying oven at a temperature of approximately 100° C. under nitrogen atmosphere, to remove the methanol solvent and leave a salt coating of iron (III) chloride on the iron film. The salt-doped, iron-coated roving then was packaged under nitrogen atmosphere in a moisture-proof package.

While preferred and illustrative embodiments of the invention have been described, it will be appreciated that numerous modifications, variations, and other embodiments are possible, and accordingly, all such apparent modifications, variations, and embodiments are to be regarded as being within the spirit and scope of the present invention.

What is claimed is:

1. An article comprising a non-conductive substrate having coated thereon a sub-micron thickness of an oxidizable metal coating with an exterior surface, and from about 0.005% to about 25% by weight, based on the weight of oxidizable metal in the oxidizable metal coating, of a salt which is effective to accelerate the rate of oxidization of the oxidizable metal coating under oxidation conditions therefor, the salt being present on the exterior surface of the oxidizable metal coating.

2. An article according to claim 1, wherein the oxidizable metal coating has a thickness of from about $2\times10^{-3}$ to about 0.25 micron.

3. An article according to claim 1, wherein the salt is present on the oxidizable metal coating at a loading of from about 0.1% to about 20% by weight, based on the weight of oxidizable metal coated on the non-conductive substrate.

4. An article according to claim 1, wherein the salt is present on the oxidizable metal coating at a loading of from about 0.5 to about 15% by weight, based on the weight of oxidizable metal coated on the non-conductive substrate.

5. An article according to claim 1, wherein the salt is selected from the group consisting of metal salts and organic salts.

6. An article according to claim 1, wherein the salt is a metal salt.

7. An article according to claim 1, wherein the salt is a metal salt selected from the group consisting of metal halides, metal nitrates, and metal sulfates.

8. An article according to claim 1, wherein the salt is an organic salt selected from the group consisting of citrate, acetate, and stearate salts.

9. An article according to claim 1, wherein the non-conductive substrate is formed of a material selected from the group consisting of glasses, polymers, pre-oxidized carbon, non-conductive carbon, and ceramic materials.

10. An article according to claim 1, wherein the non-conductive substrate is formed of a glass material.

11. An article according to claim 1, wherein the non-conductive substrate is formed of an oxide glass.

12. An article according to claim 1, wherein the non-conductive substrate is formed of a silicate glass.

13. An article according to claim 1, wherein the non-conductive substrate is formed of a material selected from the group consisting of sodium borosilicate glasses, calcium silicate glasses, sodium silicate glasses, aluminosilicate glasses, and aluminoborosilicate glasses.

14. An article according to claim 1, wherein the oxidizable metal coating is selected from the group consisting of iron, nickel, copper, tin, zinc, and oxidizable alloys thereof.

15. An article according to claim 1, wherein the oxidizable metal coating is formed of iron or ferrous metal deposited from an organoiron precursor.

16. An article according to claim 1, wherein the oxidizable metal coating is an oxidizable iron coating formed by chemical vapor deposition of iron from a precursor material selected from the group consisting of iron pentacarbonyl and ferrocene.

17. An article according to claim 1, wherein the oxidizable metal coating has a thickness of from about 0.025 to about 0.15 micron.

18. An article according to claim 1, wherein the salt is selected from the group consisting of metal halides, metal sulfates, metal nitrates, and organic salts.

19. An article according to claim 1, wherein the salt is a metal halide whose halogen constituent is chlorine.

20. An article according to claim 1, wherein the salt is selected from the group consisting of lithium chloride, iron (III) chloride, zinc chloride, sodium chloride, and copper sulfate.

21. An article according to claim 1, comprising from about 0.01% to about 20% by weight of salt, based on the weight of oxidizable metal, on the oxidizable metal coating.

22. An article according to claim 1, comprising from about 0.5% to about 15% by weight salt, based on the weight of oxidizable metal, on the oxidizable metal coating.

23. An article according to claim 1, wherein the oxidizable metal coating has a thickness of from about 0.025 micron to about 0.1 micron.

24. An article according to claim 1, wherein the oxidizable metal coating is formed of iron.

25. An article according to claim 1, wherein a coating of the salt is formed on the oxidizable metal-coated substrate by solution bath contacting of the oxidizable metal-coated substrate, where the solution bath comprises an anhydrous solvent solution of the salt.

26. An article according to claim 1, wherein a coating of the salt is formed on the oxidizable metal-coated substrate by exposing the oxidizable metal-coated substrate to a halogen gas for reaction of the oxidizable metal therewith, to yield a halide salt on the oxidizable metal-coated substrate.

27. An article according to claim 1, further comprising an interlayer between the non-conductive substrate and the oxidizable metal coating thereon, which enhances the adhesion of the oxidizable metal coating to the non-conductive substrate.

28. An article according to claim 1, wherein the salt on the exterior surface of the oxidizable metal coating is present in a form selected from the group consisting of gross crystallites, microcrystals, and mixtures thereof.

29. An article according to claim 1, wherein the non-conductive substrate is in the form of a filament.

30. An article according to claim 29, wherein the filament has a diameter of from about 0.5 to about 25 microns.

31. An article according to claim 24, werhein the filament has a diameter of from about 2 to about 15 microns.

32. An article according to claim 29, wherein the oxidizable metal coating is formed on the substrate by chemical vapor deposition from an organometallic precursor material.

33. A filamentous article, comprising:

a non-conductive filament substrate having a density of from about 1.3 to about 2.9 grams per cubic centimeter, and a diameter of from about 0.5 to about 25 microns;

a metal coating of an oxidizable metal selected from the group consisting of iron, copper, zinc, tin, nickel, and combinations thereof, coated on the non-conductive filament substrate at a thickness of from about 0.002 to about 0.25 microns, and having an exterior metal coating surface; and on the exterior surface of the oxidizable metal coating, from about 0.005% to about 25% by weight, based on the weight of oxidizable metal in the oxidizable metal coating, of a salt which is selected ffrom the group consisting of metal salts and organic salts, and which is effective to enhance the rate of oxidization of the oxidizable metal coating under oxidizing conditions therefor.

34. A multifilament tow comprising from about 200 to about 50,000 filament elements, each said filament element comprising:

a non-conductive filament substrate having a density of from about 1.3 to about 2.9 grams per cubic centimeter, and a diameter of from about 0.5 to about 25 microns;

a metal coating of an oxidizable metal selected from the group consisting of iron, copper, zinc, tin, nickel, and combinations thereof, coated on the non-conductive filament substrate at a thickness of from about 0.002 to about 0.25 microns, and having an exterior metal coating surface; and on the exterior surface of the oxidizable metal coating, from about 0.005% to about 25% by weight, based on the weight of oxidizable metal in the oxidizable metal coating, of a salt which is selected from the group consisting of metal salts and organic salts, and which is effective to enhance the rate of oxidization of the oxidizable metal coating under oxidizing conditions therefor.

35. A multifilament tow according to claim 34, comprising from about 1000 to about 12,000 of said filament elements.

* * * * *

UNITED STATES PATENT AND TRADEMARK OFFICE
CERTIFICATE OF CORRECTION

PATENT NO. : 5,034,274

DATED : July 23, 1991

INVENTOR(S) : Ward C. Stevens, Et Al

It is certified that error appears in the above-identified patent and that said Letters Patent is hereby corrected as shown below:

Column 1, line 12, change "07/449,709" to --07/449,708--.
Column 7, line 47, after "chloride", insert -- first occurrence--,
Column 9, line 44, change "$Al_{23}$" to --$Al_2O_3$--.
Column 9, line 66, change "fourpoint" to --four-point--.
Column 9, line 67, after "paint", insert --.--.
Column 10, line 41, change "ironcoated" to --iron-coated--.
Column 10, line 43, change "ironcoated" to --iron-coated--.
Column 11, line 21, change "saltcoated" to --salt-coated--.
Column 14, line 13, change "werhein" to --wherein--.
Column 14, line 35, change "ffrom" to --from--.

Signed and Sealed this

Twenty-ninth Day of December, 1992

*Attest:*

DOUGLAS B. COMER

*Attesting Officer* *Acting Commissioner of Patents and Trademarks*